June 16, 1942. C. H. GEMBERLING 2,286,359
AGRICULTURAL IMPLEMENT
Filed April 6, 1939 2 Sheets-Sheet 1
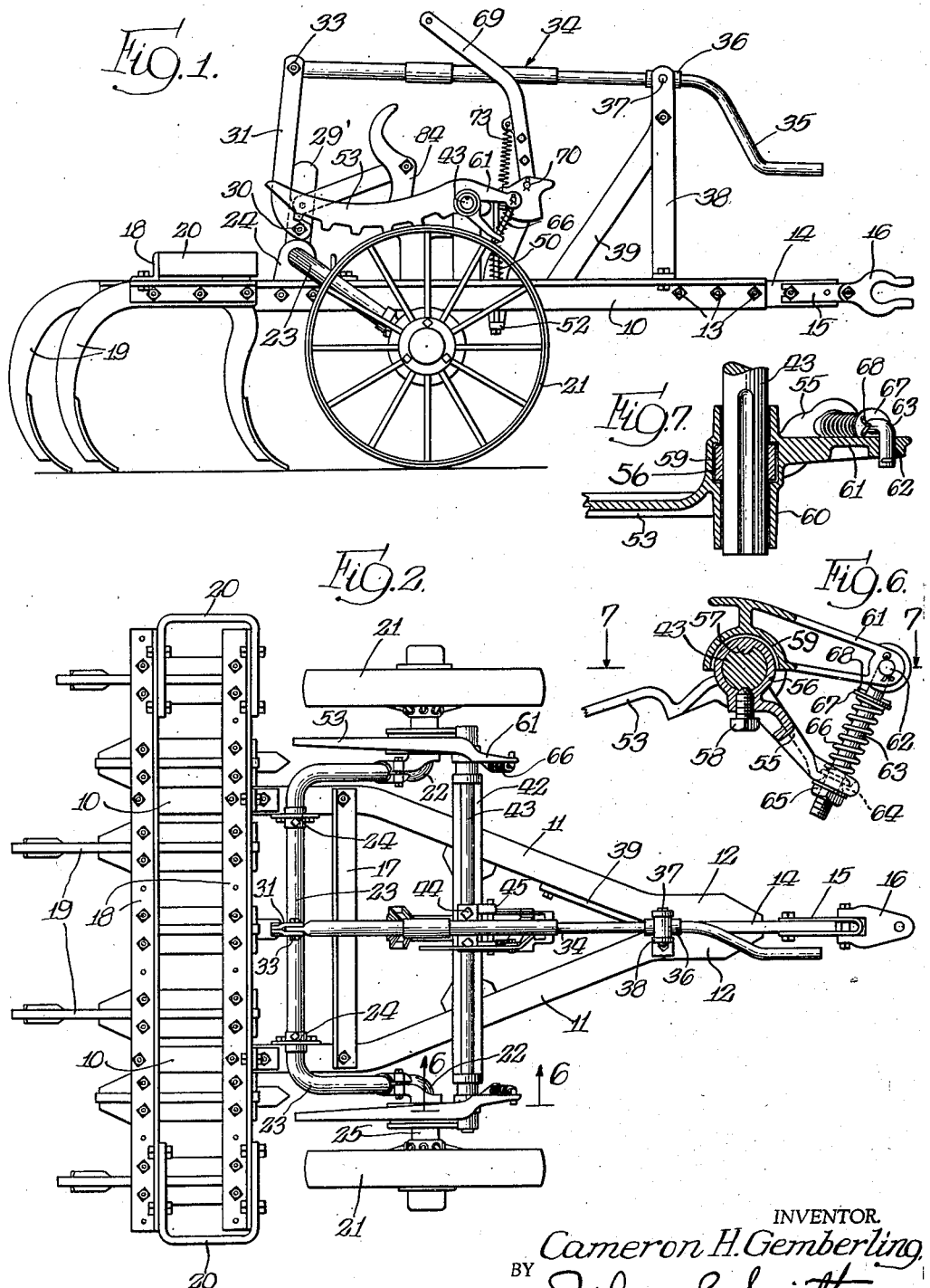
INVENTOR.
Cameron H. Gemberling
BY John P. Smith
ATTORNEY.

June 16, 1942.  C. H. GEMBERLING  2,286,359
AGRICULTURAL IMPLEMENT
Filed April 6, 1939  2 Sheets-Sheet 2
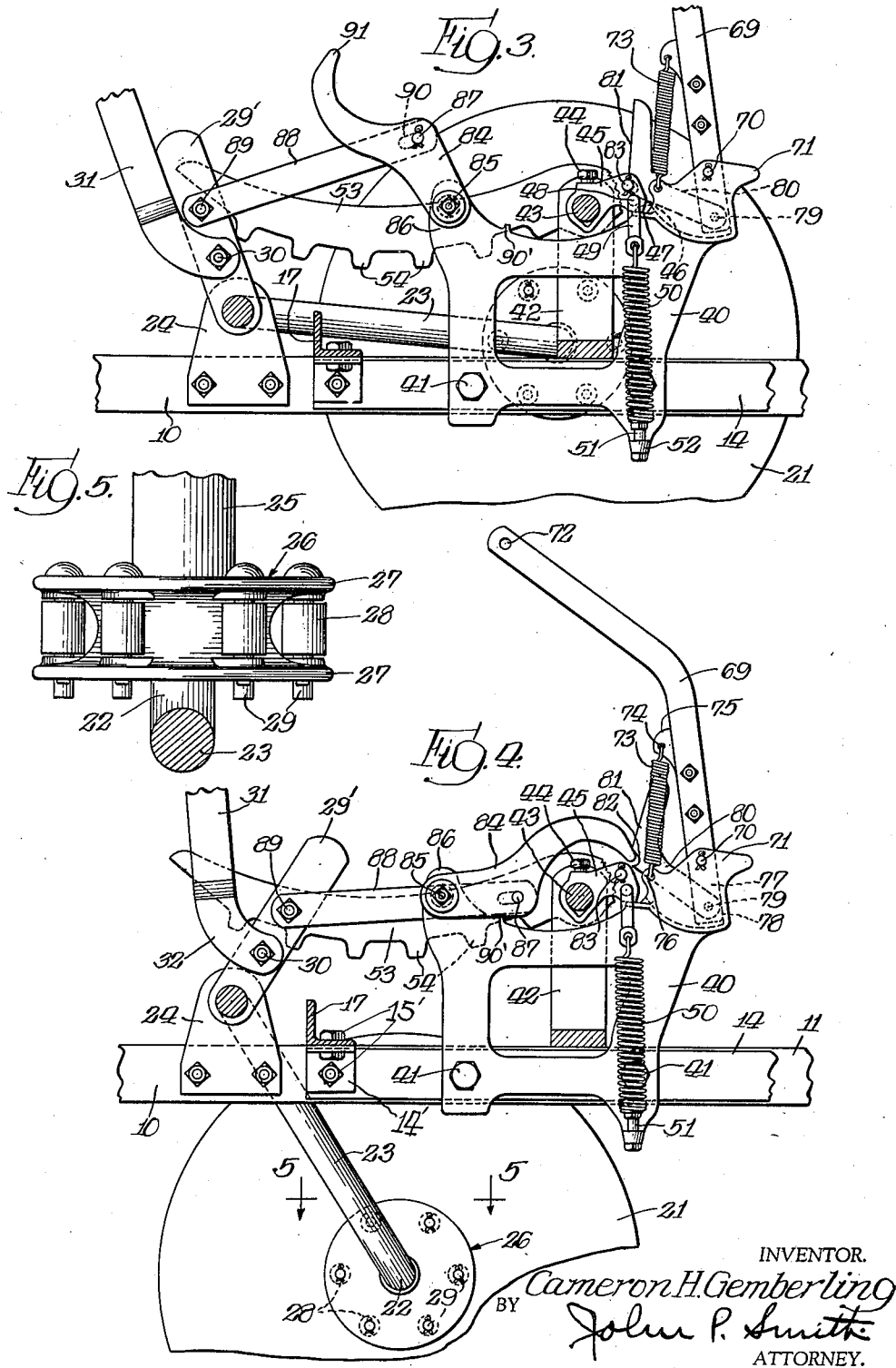
INVENTOR.
Cameron H. Gemberling,
BY John P. Smith
ATTORNEY.

Patented June 16, 1942

2,286,359

UNITED STATES PATENT OFFICE 2,286,359

AGRICULTURAL IMPLEMENT

Cameron H. Gemberling, South Bend, Ind., assignor to Oliver Farm Equipment Company, a corporation of Delaware Application April 6, 1939, Serial No. 266,306

14 Claims. (Cl. 97—73)

The present invention relates generally to agricultural implements, but more particularly to a power lift unit which is adapted to support thereon a variety of earth working tools or similar implements which must, of necessity, be raised or lowered with respect to the ground by the forward movement of the unit.

The primary object of the present invention is to provide a novel and improved power lift unit which is adapted to support thereon a plurality or a variety of earth working tools which may be raised or lowered with respect to the ground by the manipulation of the trip lever and the actuation of the power lift mechanism carried by the unit.

A further object of the invention is to provide a novel and improved construction of a universal power lift unit mounted on two supporting wheels and arranged so that both of these wheels may be simultaneously employed for actuating the power lift unit to raise or lower the earth working tool with respect to the ground.

Another object of the invention is to provide a simple, efficient and universal type of power lift unit in which two racks are employed to engage pinions carried by the opposite supporting wheels for lifting the unit by the forward motion of the unit and in which the racks are automatically disengaged from the pinions either simultaneously or separately when the pinions have reached the end of the racks.

Another object of the invention is to provide a novel and improved construction of power lift mechanism of the rack and pinion type in which the trip lever thereof is adapted to alternately or simultaneously permit the racks to engage the opposite pinions and automatically lock the unit in elevated position by an arrangement of over center links.

These and other objects are accomplished by providing a construction and an arrangement of the various parts in the manner hereinafter described and particularly pointed out in the appended claims.

Referring to the drawings:

Fig. 1 is a side elevational view illustrating one form my invention may assume in practice and in which cultivating shovels are shown thereon;

Fig. 2 is a top plan view of the device shown in Fig. 1;

Fig. 3 is an enlarged fragmentary and longitudinal cross sectional view of the power lift mechanism showing the position of these parts when the earth working tool is in ground engaging position;

Fig. 4 is an enlarged fragmentary and longitudinal cross sectional view showing the position of the power lift parts when the earth working tools are raised out of engagement with the ground;

Fig. 5 is a cross sectional view taken on the line 5—5 in Fig. 4;

Fig. 6 is a cross sectional view taken on the line 6—6 in Fig. 2; and

Fig. 7 is a cross sectional view taken on the line 7—7 in Fig. 6.

For the purpose of illustration I have shown my improved power lift unit comprising two longitudinal angle frame members 10 which have their rear ends arranged parallel and spaced apart with respect to each other and their intermediate ends converging as shown at 11. The foremost ends of these frame members 10 extend parallel with respect to each other as shown at 12 and have secured therebetween by means of bolts 13 a longitudinal frame and draft extension member 14. Secured to the forward end of the draft extension member 14 by means of a bracket 15 is a draft clevis 16. Secured intermediate the ends of the frame members 10 is a transverse brace angle member 17. The rear end of the supplemental frame member 14 is secured to the transverse brace 17 by means of brackets 14' and bolts 15'. Secured to the rear ends of the frame members 10 and arranged transversely with respect to the longitudinal center of the unit are tool supporting spaced apart parallel frame members 18 which are provided with a plurality of apertures for securing a variety of earth working implements such as cultivator shovels or tool beams 19. The outer ends of the transverse tool supporting frame members 18 are secured together by opposite U-shaped brackets 20. The frame of the unit is supported on carrying wheels 21 which are journaled on the outwardly extending aligned shanks 22 of a U-shaped bail or axle member 23. The opposite portions of the bail 23 are journaled in bearing brackets 24 which in turn are secured to the opposite side frame members 10. Secured to the hub 25 of each of the wheels 21 in any well known manner, are raising pinions generally indicated by the reference character 26. These raising pinions include two spaced apart disc-like surfaces 27 between which are mounted rollers 28 journaled on equally spaced apart pins 29 extending through aligned apertures in the discs 27. (See Fig. 5.) Rigidly secured to the center of the bail member 23 and extending upwardly therefrom is a crank arm or lever 29'. Pivotally attached to the lever 29' at a point adjacent the bail member 23, as shown at 30, is a second lever 31 which has its lower end curved forwardly as shown at 32. This lever 31 is preferably made of two flat steel members so that the lower portion thereof engages the opposite sides of the lever 29' so that the upper portion of the lever 31 lies in the path of the lever 29' so as to contact edge to edge and form a stop as shown in Fig. 3 of the drawings in the operation of regulating the depth penetration of the earth working tool carried by the unit in the manner hereinafter described. The upper end of the lever 31 is pivotally connected as shown at 33 to the rear end of an adjustable screw extension, generally indicated by the reference character 34. This adjustable screw extension is of any conventional form and is provided with a crank handle 35 for effecting the adjustment of the lever 31. The forward end of the adjustable connection 34 is mounted in a conventional swivel connection or bearing 36 which in turn is pivoted as shown at 37 to the upper end of a standard 38 which has its lower end secured to one of the frame members 12. The standard 38 is supported in position by a brace member 39. Located in the longitudinal center of the unit and secured by means of a bolt 41 adjacent the rear end of the longitudinal frame or draft member 14 is a bracket or casting 40. Secured to the main frame member 11 in any well known manner and extending through an opening in the casting 40 is a U-shaped bracket or strap 42. Journaled in the upper ends or arms of the U-shaped bracket 42 is a shaft 43. Rigidly secured to the shaft 43 by means of a set screw 44 is a crank arm 45. The outer end of the crank arm 45 is provided with a projection 46 which is adapted to engage a stop 47 formed on the bracket 40 so as to limit the rotary movement of the shaft 43 in a clockwise direction as viewed in Figs. 3 and 4 of the drawings. Pivotally connected to the arm 45 as shown at 48 by means of a link 49 is a spring 50, the lower end of which is connected by means of an adjustable bolt 51 to an ear 52 formed on the bracket 40. Loosely mounted on the opposite ends of the shafts 43 are curved racks 53. Each of these curved racks 53 are provided with properly spaced apart teeth 54 and are adapted to be swung into engagement with the rollers 28 of the pinions 26 carried by each of the supporting wheels 21. As previously pointed out the racks 53 are loosely mounted on the shaft 43, but are limited in their free movement and located on the shaft by arms 55 which have barrel portions 56 embracing the shaft 43 and secured thereto by keys 57 and set screws 58. (See Figs. 6 and 7.) These barrel portions 56 of each of these spring arms 55 are located in the complementary recesses 59 of the bearing portions 60 of each of the racks 53. (See Figs. 6 and 7). Extending forwardly from the shaft 43 and formed integrally with each of the racks 53 are arms 61. Pivotally connected to the forward ends of each of the arms 61 as shown at 62 are links 63. The lower ends of the links 63 extend through apertures 64 in the free ends of each of the arms 55 and are adjustably secured thereto by nuts 65 mounted in threaded engagement with the lower ends of each of the links 63. Embracing each of the links 63 and having their respective lower ends engaging the free ends of each of the arms 55 are springs 66. The upper end of each spring 66 engages a washer 67 which is retained in position by a cotter 68 extending through an aperture at a point adjacent the upper end of the link 63. Obviously with this arrangement when the lever 69 is tripped the racks will be forced by the pawl 80 into engagement so that the teeth 54 engage the rollers 28 of the pinions 26. If, however, one of the pinions is not in position to engage the teeth of the racks, the loosely mounted arrangement of the racks will permit one or the other of said racks to engage its respective pinion. As soon as the second pinion is revolved sufficiently so as to permit its engagement with the teeth of the co-operative rack, it, in turn, will engage and the two racks will then cooperate to lift the unit.

The mechanism which controls the tripping of the racks and the locking of the unit in raised position will next be described. This mechanism includes a trip lever 69 which is pivoted as shown at 70 to an upwardly extending flange portion 71 of the bracket 40. The upper end of the lever 69 is provided with an aperture 72 through which a rope may be inserted for controlling the actuation of the lever from the operator's seat on the tractor. The lever 69 is normally returned to its rearmost position or the position shown in Fig. 4 of the drawings by an expansion spring 73, the upper end of which as shown at 74 is secured to an ear 75 attached to the lever. The lower end of the spring 73 is connected to an ear as shown at 76 formed on the bracket 40. The lever 69 has a portion extending below its pivot 70 as indicated at 77 and is adapted to contact a rear wall 78 of the bracket 40 in limiting the rearward movement of the upper end of the lever 69. Pivotally connected to the lower end 77 of the lever 69 as shown at 79 is a gravity actuated pawl 80. The gravity actuated pawl 80 is substantially L-shaped in formation and has an upwardly extending arm or projection 81 whose rear surface is substantially a straight line. The lower end of the arm 81 terminates in a semi-circular recess as shown at 82. This recess 82 is adapted to engage a pin 83 carried by the arm or crank 45 secured to the shaft 43. Obviously upon the actuation of the lever 69 in a forward direction from the position shown in Fig. 3 the recess 82 of the gravity lever 80 will engage the pin 83 to actuate the crank 45 in a counterclockwise direction as viewed in Fig. 3 and thereby lower the racks 53 into engagement with the opposite pinions 26 preparatory to the operation of raising the unit and the ground engaging tools carried thereby from ground engaging position to raised or elevated inoperative position.

The mechanism which locks the unit in elevated or in the position in which the earth working implements are raised from ground engaging position includes a toggle link mechanism which comprises a hook-like link 84. This link 84 is pivoted at 85 to an ear 86 formed on the bracket 40. Pivotally and slidably connected by means of a pin 87 to an intermediate portion of the hook-like link 84 is a link 88. The rear end of the link 88 is connected as shown at 89 to an intermediate portion of the crank arm 29'. The forward end of the link 88 is provided with an elongated slot 90 through which the pin 87 extends to permit a slight lost motion connection between these links. The free end of the link 84 has a hook-like or curved portion which terminates in a rounded nose as shown at 91 which is adapted to move into the path of the arm 81 of the gravity latch 80 so as to be in position to be engaged by the curved recess 82 of the gravity latch 80 in the manner hereinafter described. In this connection it will be noted that when the unit is raised or the earth working tools elevated from the ground the toggle links 84 and 88 are such that the pivotal connections 89 and 87 are positioned below the pivotal or dead center 85 of the link 84 and the lower edge of the link 88 is at rest against a stop 90' located in the path of the link 88 and formed on the bracket 40.

Summarizing the advantages and operation of my improved power lift universal unit for agricultural implements of the earth working type, let us assume that the earth working tools carried by the universal unit or frame are in their lowermost or ground engaging position and that the operative parts of the power lift are in the position shown in Fig. 3 of the drawings. Upon the manipulation of the trip lever 69 forwardly the semi-circular recess 82 of the gravity latch 80 will be moved rearwardly to engage the pin 83 on the crank 45 and thereby actuate the shaft 43 in a counter-clockwise direction as viewed in Fig. 3 of the drawings, thereby lowering the racks on the opposite sides of the shaft 43 into engagement with the pinions 26 secured to the opposite wheels 21 of the unit. The racks 53, as hereinafter pointed out, are loosely mounted on the shaft 43 and are normally pressed into engagement by their compression springs 66 located between the spring arm 55 and the arm 61 of each of the racks. This spring arrangement permits a yielding action on the racks 53 so that they may successively or simultaneously engage their respective pinions depending on the position of the pinion with respect to the teeth of the rack. This spring arrangement also permits one rack to automatically disengage its cooperating pinion when it has reached the end of the rack so that the other may be continually engaged until the last tooth on the rack is disengaged from the other pinion. When the racks 53 are lowered into engagement with their respective pinions by the actuation of the lever 69 the traction of the forwardly moving implements will raise the frame actuating the bail or axle 23 downwardly to the position shown in Fig. 4. As the bail 23 is actuated downwardly, the lever 29' is actuated forwardly, which in turn, moves the toggle links 88 and 84 forwardly to a position in which the lower edge of the link 88 strikes the stop 90' on the bracket 40, thereby locking the link 88 past dead center as shown in Fig. 4 of the drawings to retain the ground engaging tools in an elevated position. Should the operator be desirous of lowering the tools the lever 69 is tripped forwardly and the recess 82 engages the pointed portion 91 of the link 88 to unlock the toggle links past dead center and thereby lower the ground engaging tools to ground engaging position. In this connection it will be noted that as the pointed portion 91 is being swung forwardly it is adapted to engage the straight surface 81 of the gravity latch and swing the same forwardly so as to be in the position to engage the semi-circular recess 82 in the latch 80 as shown in Fig. 4 of the drawings.

From the above it will be seen that while I have described and illustrated a field cultivator and the manner in which my improved power lift is adapted to be used in connection therewith, it will, of course, be understood that a variety of types of ground engaging tools other than those shown in the drawings may be mounted on the frame structure and operate with equal efficiency.

In the above specification I have described one embodiment which my invention may assume in practice, it will of course, be understood that the same is capable of modification and that modification may be made without departing from the spirit and scope of the invention as expressed in the following claims:

What I claim is my invention and desire to secure by Letters Patent:

1. An agricultural implement comprising a frame, earth working tools carried by said frame, carrying wheels for said frame, an axle pivotally connecting said wheels with said frame, pinions carried by said wheels, freely movable racks carried by said frame and engageable with said pinions, means for automatically raising and normally holding said racks out of engagement with said pinions, means for locking said frame in raised position with respect to said wheels, and a single gravity actuated pawl for unlocking said locking means and actuating said racks into engagement with said pinions for raising said frame on said wheels.

2. An agricultural implement, comprising a frame, earth working tools carried by said frame, a U-shaped axle pivoted to said frame, wheels journaled on the free ends of said axle, pinions secured to said wheels, a rack shaft journaled on said frame, racks mounted loosely on the opposite ends of said shaft and engageable with the respective pinions, crank arms secured to said shaft, spring actuated link connections between said arms and said racks, a crank secured to said shaft, a trip lever pivoted to said frame, a gravity actuated latch mounted on said trip lever and engageable with said last named crank for actuating said racks into engagement with said pinions.

3. An agricultural implement comprising a frame, earth working tools carried by said frame, an axle pivoted to said frame, wheels journaled on said axle, pinions secured to said wheels, a rack shaft journaled on said frame, racks loosely mounted on said shaft and engageable with the respective pinions, means for limiting the relative movement of said racks with respect to said rack shaft, a crank secured to said rack shaft, a spring for normally returning said racks to their uppermost position, a trip lever pivoted to said frame, a gravity actuated pawl pivoted to the lower end of said trip lever, means formed on one end of said gravity actuated pawl and engageable with said last named crank to actuate said racks into engagement with said pinions.

4. An agricultural tool carrying unit comprising a frame, an axle pivoted to said frame, wheels journaled on the outer ends of said axle, pinions secured to said wheels, a rack shaft oscillatably mounted on said frame, racks loosely mounted on and adjacent to the opposite ends of said shaft, yielding means between said shaft and said racks for pressing said racks into engagement with said respective pinions, a toggle link mechanism for locking said frame in elevated position, and a gravity actuated pawl for unlocking said toggle link and for actuating said racks into engagement with said pinions.

5. An agricultural tool carrying unit comprising a frame, an axle pivoted to said frame, wheels journaled on the outer ends of said axle, pinions secured to said wheels, a rack shaft oscillatably mounted on said frame, racks loosely mounted on and adjacent to the opposite ends of said shaft, yielding means between said shaft and said racks for pressing said racks into engagement with said respective pinions, spring actuated means for normally raising said racks to elevated position when said pinions reach the ends of said racks, a toggle link mechanism for locking said frame in elevated position, and a gravity actuated pawl for unlocking said toggle link mechanism and for actuating said racks into engagement with said pinions.

6. An agricultural tool carrying unit comprising a frame, an axle pivoted to said frame, wheels journaled on the outer ends of said axle, pinions secured to said wheels, a rack shaft oscillatably mounted on said frame, racks loosely mounted on and adjacent to the opposite ends of said shaft, yielding means between said shaft and said racks for pressing said racks into engagement with said respective pinions, spring actuated means for normally raising said racks to elevated position when said pinions reach the ends of said racks, a trip lever pivotally mounted on said frame, a pawl carried by said lever and operatively connected to said racks for depressing said racks into engagement with said pinions, a toggle link mechanism for locking said frame in elevated position, and means carried by said toggle link mechanism and engageable with said pawl for unlocking said toggle link mechanism.

7. An agricultural tool carrying unit comprising a frame, an axle pivoted to said frame, wheels journaled on the outer ends of said axle, pinions secured to said wheels, a rack shaft oscillatably mounted on said frame, racks loosely mounted on and adjacent to the opposite ends of said shaft, yielding means between said shaft and said racks for pressing said racks into engagement with said respective pinions, spring actuated means for normally raising said racks to elevated position when said pinions reach the ends of said racks, a crank secured to said rack shaft, a trip lever mounted on said frame, and a gravity actuated pawl carried by said lever and engageable with said crank to actuate said racks into engagement with the respective pinions.

8. An agricultural tool carrying unit comprising a frame, an axle pivoted to said frame, wheels journaled on the outer ends of said axle, pinions secured to said wheeds, a rack shaft oscillatably mounted on said frame, racks loosely mounted on and adjacent to the opposite ends of said shaft, arms secured to said shaft, spring connections between said arms and said racks, a crank secured to said shaft, a spring connection between said crank and said frame for returning said racks to elevated position, a trip lever pivoted to said frame, and a pawl carried by said lever and engageable with said crank for actuating said racks into engagement with said pinions.

9. An agricultural tool carrying unit comprising a frame, an axle pivoted to said frame, wheels journaled on the outer ends of said axle, pinions secured to said wheels, a rack shaft oscillatably mounted on said frame, racks loosely mounted on and adjacent to the opposite ends of said shaft, arms secured to said shaft, spring connections between said arms and said racks, a crank secured to said shaft, a spring connection between said crank and said frame for returning said racks to elevated position, a trip lever pivoted to said frame, a latch carried by said lever and engageable with said crank for actuating said racks into engagement with said pinions, a crank secured to said axle, and a toggle link mechanism including two links pivotally connecting said last named crank with said frame for locking said frame in elevated position above the ground.

10. An agricultural tool carrying unit comprising a frame, an axle pivoted to said frame, wheels journaled on the outer ends of said axle, pinions secured to said wheels, a rack shaft oscillatably mounted on said frame, racks loosely mounted on and adjacent to the opposite ends of said shaft, arms secured to said shaft, spring connections between said arms and said racks, a crank secured to said shaft, a spring connection between said crank and said frame for returning said racks to elevated position, a trip lever pivoted to said frame, a latch carried by said lever and engageable with said crank for actuating said racks into engagement with said pinions, a crank secured to said axle, a toggling mechanism including two links pivotally connecting said last named crank with said frame for locking said frame in elevated position above the ground, and means formed on one end of said links and located in the path of said latch for unlocking said links to lower said frame with respect to the ground.

11. An agricultural tool carrying unit comprising a frame, an axle pivoted to said frame, wheels journaled on the outer ends of said axle, pinions secured to said wheels, a rack shaft oscillatably mounted on said frame, racks loosely mounted on and adjacent to the opposite ends of said shaft, arms secured to said shaft, spring connections between said arms and said racks, a crank secured to said shaft, a spring connection between said crank and said frame for returning said racks to elevated position, a trip lever pivoted to said frame, a latch carried by said lever and engageable with said crank for actuating said racks into engagement with said pinions, a crank secured to said axle, a toggle link mechanism including two links pivotally connecting said last named crank with said frame for locking said frame in elevated position above the ground, a stop on said frame and engageable with one of said links for locking said links past dead center, and a forwardly projecting portion formed on one of said links and located in the path of said latch for engagement therewith to unlock said links to lower said frame.

12. An agricultural implement comprising a frame, earth working tools carried by said frame, an axle pivoted to said frame, wheels journaled on said axle, pinions secured to said wheels, a shaft journaled on said frame, racks loosely mounted on said shaft and engageable with the respective pinions, separate springs between said racks and said shaft for depressing said racks into engagement with the respective pinions when said racks are in their lower positions, a gravity actuated pawl for moving said racks into engagement with said pinions, means for automatically raising said racks, means for locking said frame in raised position, and means formed on said last named means engageable with said pawl for unlocking said locking means.

13. An agricultural implement for earth working tools comprising a universal frame, carrying wheels for said frame, an axle pivotally connecting said wheels to said frame, pinions carried by said wheels, freely movable racks carried by said frame and engageable with said pinions, spring actuated means for automatically raising and normally holding said racks out of engagement with said pinions, separate springs for each rack for depressing said racks into engagement with said pinions when the racks are in their lowermost positions, a tripping mechanism mounted on said frame including a lever and a gravity actuated pawl operatively connected to said racks for lowering said racks into engagement with said pinions, a locking mechanism for locking said frame in elevated position with respect to said wheels, and means formed on said locking mechanism and engageable with said tripping mechanism for unlocking said locking mechanism to lower said earth working implements into the ground.

14. An agricultural implement comprising a frame, earth working tools carried by said frame, an axle pivoted to said frame, wheels journaled on said axle, pinions secured to said wheels, a shaft journaled on said frame, racks loosely mounted on said shaft and engageable with the respective pinions, spring actuated means between said shaft and said racks, manually controlled means having a gravity actuated pawl for moving said racks into engagement with said pinions, locking means for locking said frame in raised position, and means formed on said gravity pawl and engageable with said locking means for unlocking said locking means.

CAMERON H. GEMBERLING.